United States Patent
Ichikawa

(10) Patent No.: US 7,079,291 B2
(45) Date of Patent: Jul. 18, 2006

(54) METHOD FOR HARD-COPYING WEB PAGES, METHOD FOR PRINTING DISPLAY SCREENS, SYSTEM FOR HARD-COPYING WEB PAGES, AND INTERNET CONNECTION DEVICE EQUIPPED WITH CURRENT-POSITION DETECTION CAPABILITIES

(75) Inventor: Osamu Ichikawa, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 09/971,807

(22) Filed: Oct. 5, 2001

(65) Prior Publication Data

US 2002/0041399 A1    Apr. 11, 2002

(30) Foreign Application Priority Data

Oct. 5, 2000    (JP) .............................. 2000-306542

(51) Int. Cl.
*H04N 1/00*    (2006.01)

(52) U.S. Cl. ...................... 358/402; 358/402; 358/400; 358/1.15; 358/1.1

(58) Field of Classification Search ............... 358/1.15, 358/402
See application file for complete search history.

(56) References Cited

U.S. PATENT DOCUMENTS

| | | | | |
|---|---|---|---|---|
| 6,240,445 | B1 * | 5/2001 | Kumar et al. ................ | 709/206 |
| 6,477,581 | B1 * | 11/2002 | Carpenter et al. ........... | 709/238 |
| 6,515,765 | B1 * | 2/2003 | Umebayashi ................ | 358/1.9 |
| 6,564,193 | B1 * | 5/2003 | Shore et al. ................. | 705/400 |
| 6,623,527 | B1 * | 9/2003 | Hamzy ........................ | 715/513 |
| 6,674,453 | B1 * | 1/2004 | Schilit et al. ................ | 715/810 |
| 6,690,777 | B1 * | 2/2004 | Pecht ..................... | 379/100.01 |
| 6,775,026 | B1 * | 8/2004 | Kato .......................... | 358/1.15 |
| 2001/0029531 | A1 * | 10/2001 | Ohta .......................... | 709/223 |
| 2001/0034747 | A1 * | 10/2001 | Fujitani et al. .............. | 707/525 |
| 2002/0018236 | A1 * | 2/2002 | Musk et al. ................ | 358/1.15 |
| 2002/0024686 | A1 * | 2/2002 | Uchiyama et al. .......... | 358/407 |

* cited by examiner

*Primary Examiner*—Kimberly Williams
*Assistant Examiner*—Ashish Thomas
(74) *Attorney, Agent, or Firm*—Whitham, Curtis, Christofferson & Cook, PC; Stephen C. Kaufman

(57) ABSTRACT

A user is enabled to obtain a hard copy of a Web page readily when the user browses a Web page using an Internet connection device such as a portable telephone that has no printer connected thereto. A fax transmission request icon is displayed on the Web page. When the user clicks the fax transmission request icon, a fax server is notified of the URL of the Web page and the display screen switches to present the Web page of the fax server. The user then enters his/her member ID for accounting and the fax number of a destination fax machine. The fax server then accesses the notified URL, generates fax output data based on the Web page and sends it to the destination fax machine.

13 Claims, 6 Drawing Sheets

[Figure 1]
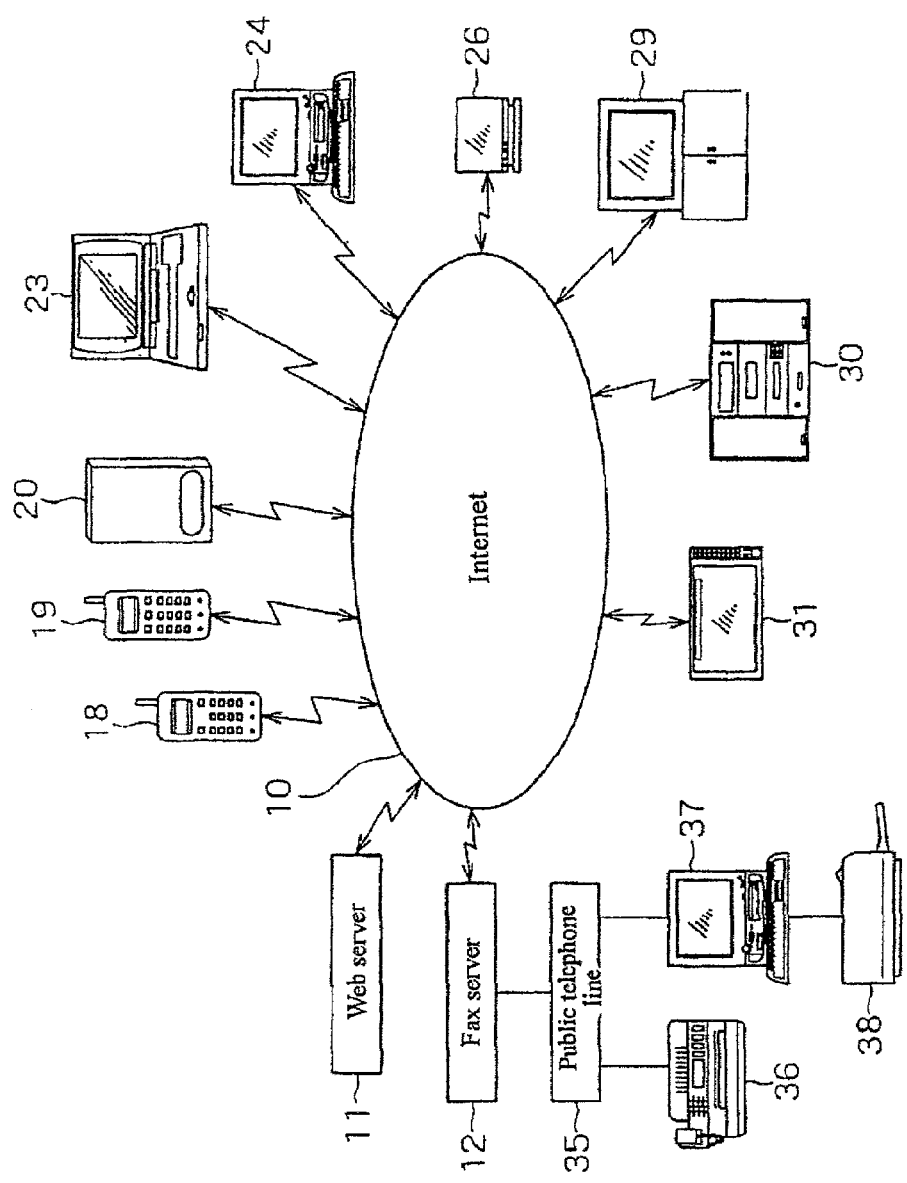

[Figure 2]
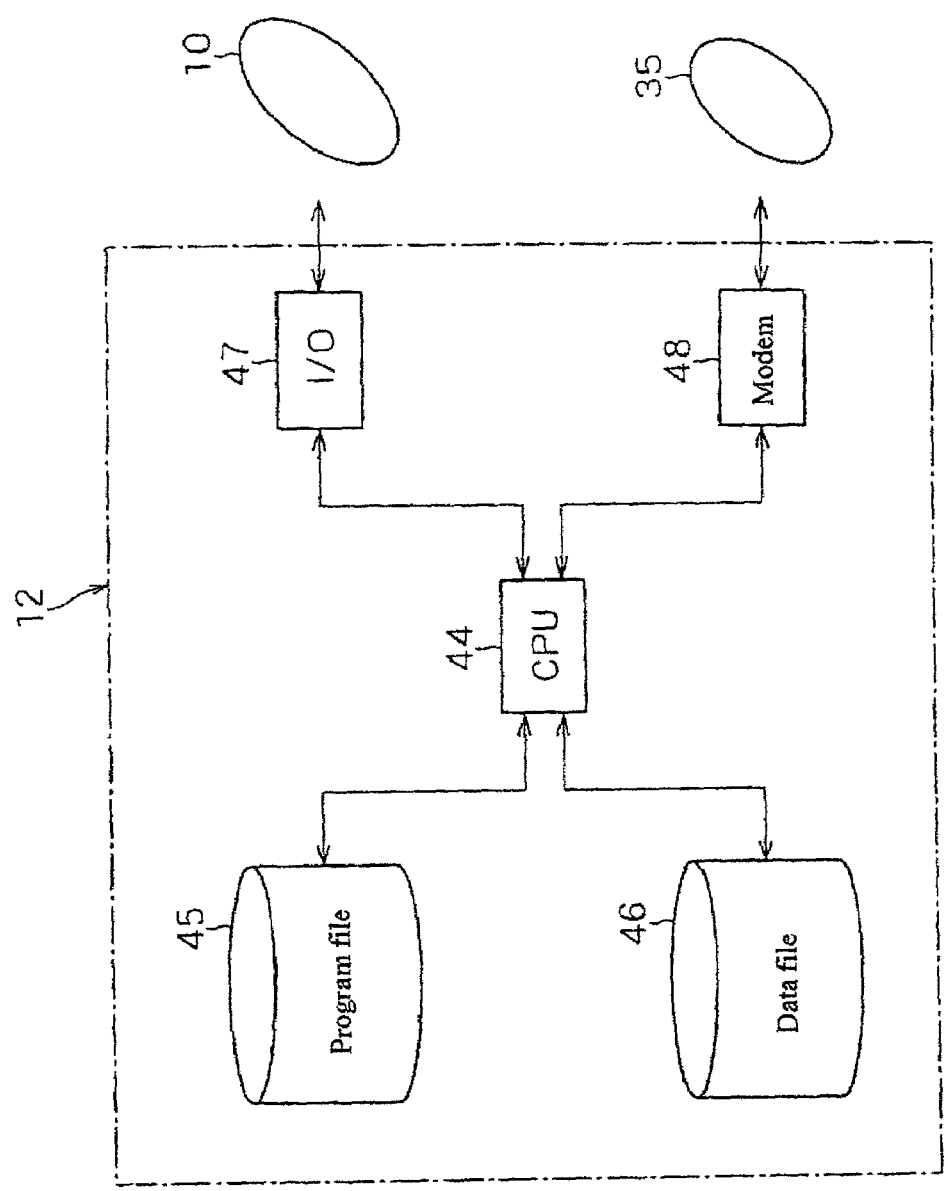

[Figure 3]
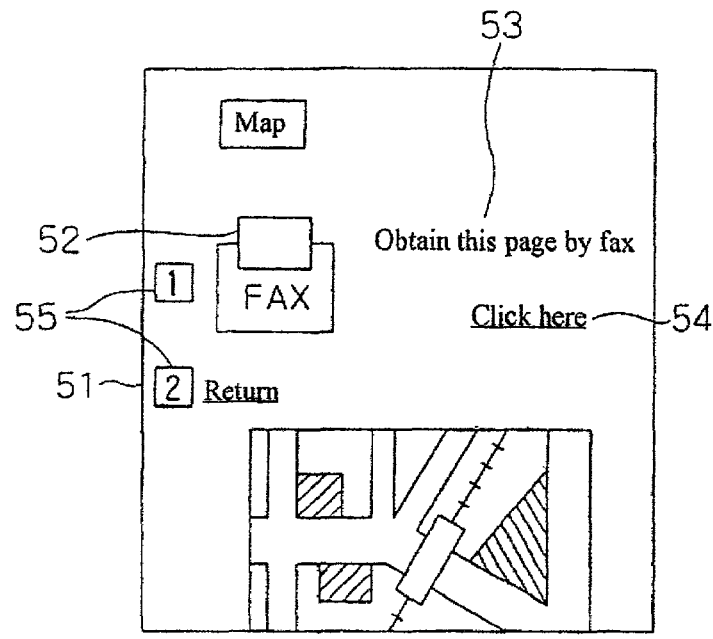
[Figure 4]
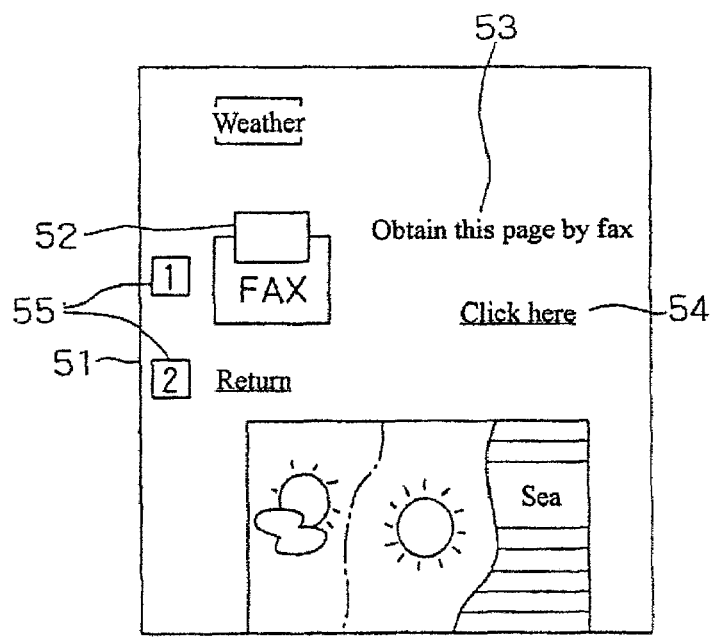

[Figure 5]

```
<a>
<a href= "faxserver.ibm.com/scripts/Fax1.exe?url=www.jp.ibm.com">
<img width=468 height=60 src="Fax1.gif" alt="Click Here!!" Border=0>
</a>
```

[Figure 6]
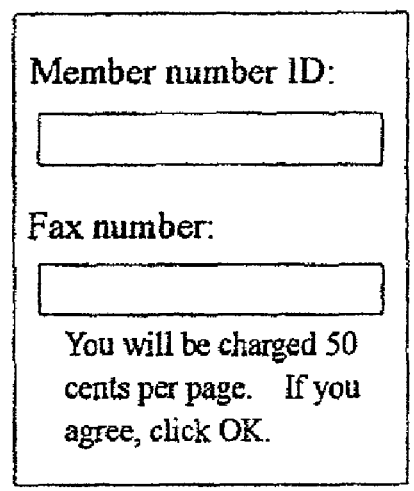
[Figure 7]
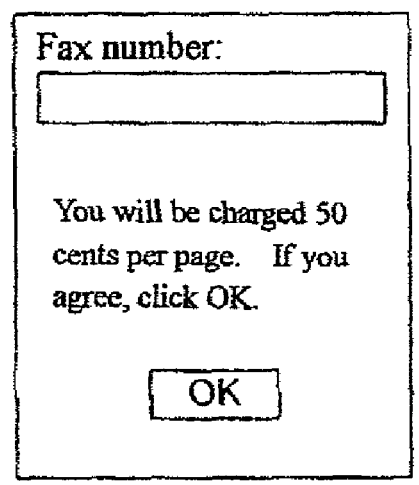

[Figure 8]

You can print out this page on a fax machine.
Call the telephone number xxx-xxxx-xxxx from the fax machine to be used for printout and enter the following receipt identifier.
PIN: 1779
This PIN is valid for seven days from today.

[Figure 9]

You can print out this page on a fax machine.
Call the telephone number xxx-xxxx-xxxx from the fax machine to be used for printout and enter the following receipt identifier.
PIN: 1779
This PIN is valid for seven days from today.

Return

METHOD FOR HARD-COPYING WEB PAGES, METHOD FOR PRINTING DISPLAY SCREENS, SYSTEM FOR HARD-COPYING WEB PAGES, AND INTERNET CONNECTION DEVICE EQUIPPED WITH CURRENT-POSITION DETECTION CAPABILITIES

BACKGROUND OF THE INVENTION

1. Field of the Invention

The present invention relates to a method for hard-copying Web pages, method for printing display screens, system for hard-copying Web pages, and Internet connection device equipped with current-position detection capabilities. More particularly, it relates to a method for hard-copying Web pages, method for printing display screens, system for hard-copying Web pages, and Internet connection device equipped with current-position detection capabilities which will allow the user to obtain hard copies of Web pages readily even if no printer is connected to the Internet connection device used for browsing Web pages.

2. Related Art

Portable telephones, PDAs (Personal Digital Assistants), and Internet appliances, which are either difficult to connect with a printer or normally used without a printer connected to it, cannot obtain hard copies of Web pages promptly while browsing them on the Internet. Generally paper is easier for users to handle than a display. Besides, the display of portable telephones and the like is smaller in size than that of personal computers, making it necessary to scroll the screen in order to view an entire Web page. On the other hand, paper, on which an entire Web page is printed, is more convenient for viewing the entire page. Therefore, users often want hard copies of Web pages they are browsing.

If a user wants a hard copy of a Web page that he/she browses on an Internet connection device to which no printer is connected, he/she must memorize or write down the Universal Resource Labor (URL) of the Web page and accesses the URL again later by means of a personal computer connected with a printer and prints out the Web page on the printer. In this case, the user must have a personal computer and printer.

Some Internet service providers offer a service of outputting files received from users via the internet, to a predetermined facsimile (fax) machine. In this case, users must create and send files in the format specified by the service providers, such as text format or Graphic Interface Format (GIF), using their own personal computers. In addition, a single file in a single format produces one fax output. It is not possible to output a display consisting of two or more files in different formats such as Hynpr Text Markup Language (HTML) format and GIF format, which is the case with a Web page, on a single sheet of paper. The item for fax transmission request can be, for example, characters or an icon.

SUMMARY OF THE INVENTION

An object of the present invention is to provide a method for hard-copying Web pages, method for printing display screens, system for hard-copying Web pages, and Internet connection device equipped with current-position detection capabilities which will allow users to obtain hard copies of Web pages accessed via an Internet connection device even if the users do not have a printer.

The method for hard-copying Web pages in accordance with a first aspect of the present invention comprises:
  generating a Web page containing an item for fax transmission request;
  making a user enter the fax number of a destination fax machine if a request to fax the Web page is received from the user who browses the Web page; and
  sending fax output data of the requested Web page to the fax machine of the user-entered fax number via a telephone line.

The first to fifth aspects of the present invention relate to push-type fax transmission.

The item for fax transmission request can be, for example, characters or by icon. The fax transmission request can be made by the user, for example, by clicking or touching (if the display combines a touch panel) the item for fax transmission request, keying in the number corresponding to the item for fax transmission request, or giving a voice instruction. The Internet connection devices for use by the user to browse Web pages generally include Internet connection devices without a printer, such as portable telephones (Personal Handyphone System (PHS), which is carried on one's person, is also included in portable telephones), Personal Digital Assistants (PDAs), car navigation devices, Internet appliances such as microwave ovens with Internet connection capabilities, and audio visual devices such as television sets with Internet connection capabilities. The fax machine can be a PC (personal computer) equipped with a modem and connected with a printer. The Web pages which the user requests to be faxed may be related, for example, to maps, timetables, Television (TV) programs, or ticket information.

The fax transmission costs of the Web pages are normally charged to the user. Web pages can be faxed to the user free of charge if the owners of the Web pages bear the fax transmission costs to advertise their Web pages. Also, the costs of faxing Web pages to the user can be borne by advertisers on condition that the user browse Web pages which carry their advertisements, for a predetermined period of time.

Fax telephones are more widespread among households than are personal computers. By entering the telephone number of the fax telephone via an Internet connection device, the user can make the fax machine print out hard copies of the Web pages he/she browses. Incidentally, the user can enter not only the fax number of his/her home fax machine, but also the fax number of the fax machine located in a convenient place to receive hard copies, such as the fax number of his/her school or office fax machine.

Thus, the user can obtain hard copies of Web pages through a fax machine conveniently placed to receive them even if the Internet connection device he/she uses for browsing Web pages is not connected with a printer.

According to the method for hard-copying Web pages in accordance with a second aspect of the present invention, the method for hard-copying Web pages in accordance with the first aspect of the present invention comprises:
  preparing a fax server which sends fax output data of the requested Web page to the fax machine of the user-entered fax number via the telephone line and receives the request to fax the Web page, from the user who browses the Web page;
  making the fax server obtain the URL of the requested Web page;
  making the fax server access the obtained URL and generate the fax output data based on the Web page of the obtained URL; and making the fax server send the fax output data to the fax machine of the user-entered fax number.

The URL of the requested Web page can be delivered from the Web page to the fax server as an argument by executing a predetermined command written by means of Common Gateway Interface (CGI), Java (Trademark of Sun Microsystems. Inc.) Applets, Active X Controls, or the like.

According to the second aspect of the present invention, when the fax server receives a fax transmission request from the user, it obtains the URL of the requested Web page, accesses the Web page of the obtained URL, generates fax output data based on the Web page, and sends it to the fax machine.

According to the method for hard-copying Web pages in accordance with a third aspect of the present invention, the method for hard-copying Web pages in accordance with the first or second aspect of the present invention comprises:

making the user enter his/her member Identification (ID) associated beforehand with a predetermined fax number instead of entering the fax number of the destination fax machine; and sending the fax output data of the Web page requested by the user to the fax machine of the fax number associated with the user-entered member ID via a telephone line.

By entering a member ID associated beforehand with a predetermined fax number, the user can skip entering a fax number. By associating the user's credit card number or bank account for direct debit with the member ID, the user can skip not only entering a fax number, but also making entries for user accounting. To prevent the illegal use of the member ID, it is desirable to make the user enter his/her password together with his/her member ID.

According to the method for hard-copying Web pages in accordance with a fourth aspect of the present invention, the method for hard-copying Web pages in accordance with the first or second aspect of the present invention makes the user enter a credit card number, a debit card number, or his/her member ID for use for user accounting together with the fax number of the destination fax machine.

To prevent illegal use, it is preferable to oblige the user to enter his/her password and the card expiration date when entering the credit card number, debit card number, or member ID.

According to the method for hard-copying Web pages in accordance with a fifth aspect of the present invention, in the method for hard-copying Web pages in accordance with the first or second aspect of the present invention, the fax output data contains only the text information and/or only the image information of the Web page.

A user may want a hard copy of only the text information or image information of a Web page rather than a hard copy of all the information presented on the Web page. In such cases, only part of the Web page information is faxed to the user to reduce the transmission charge and simplify the hard copy.

The method for hard-copying Web pages in accordance with a sixth aspect of the present invention comprises:

generating a Web page containing an item for fax transmission request;

notifying the user of the telephone number of a fax server together with the receipt identifier associated with the Web page if a request to fax the Web page is received from the user who browses the Web page; and sending fax output data of the Web page corresponding to the receipt identifier to a fax machine via a telephone line if the receipt identifier is entered into the fax server from the fax machine connected to the fax server via the telephone line.

Sixth to twelfth aspects of the present invention relate to pull-type fax transmission. After requesting a fax transmission, the user goes to the location of a predetermined fax machine to access the fax server, from which he/she receives the fax transmission.

According to the method for hard-copying Web pages in accordance with a seventh aspect of the present invention, the method for hard-copying Web pages in accordance with the sixth aspect of the present invention comprises:

making the fax server receive the fax transmission request from the user who browses the Web page;

making the fax server obtain, upon receiving the fax transmission request, the URL of the requested Web page and store the URL associating it with the receipt identifier;

making the fax server access the Web page of the URL which corresponds to the receipt identifier and generate fax output data based on the Web page of the obtained URL if the receipt identifier is entered into the fax server from a fax machine connected to the fax server via a telephone line; and making the fax server send the fax output data to the fax machine via the telephone line.

Upon receiving a request from a user to fax a Web page, the fax server obtains the URL of the Web page and stores the URL associating it with the receipt identifier. Later, when the user connects a predetermined fax machine to the fax server, the fax server accesses the Web page corresponding to the stored URL and sends fax output data of the Web page to the fax machine. The fax server needs to store only the URL until the user connects a predetermined fax machine to it, saving storage space on the fax server.

According to the method for hard-copying Web pages in accordance with an eighth aspect of the present invention, the method for hard-copying Web pages in accordance with the sixth aspect of the present invention comprises:

making the fax server receive the fax transmission request from the user who browses the Web page;

making the fax server obtain, upon receiving the fax transmission request, the URL of the requested Web page, access the Web page of the URL, generate fax output data based on the Web page, and store the URL associating it with the receipt identifier; and sending the fax output data stored being associated with the receipt identifier to a fax machine via a telephone line if the receipt identifier is entered into the fax server from the fax machine connected to the fax server via the telephone line.

If the interval between the time when a fax transmission request for a Web page is received from a user and the time when the user accesses the fax server using a predetermined fax machine is extended as is the case with the seventh aspect of the present invention, the Web page may change or disappear during this interval. According to the eighth aspect of the present invention, the Web server accesses the Web page of the notified URL immediately upon fax transmission request for the Web page from a user, generates fax output data based on that Web page, and stores it in the memory or storage of the fax server. Therefore, even if the Web page changes or disappears before the user accesses the fax server using a predetermined fax machine, the user can obtain a hard copy of the Web page as it was when the user requested its fax transmission.

According to the method for hard-copying Web pages in accordance with a ninth aspect of the present invention, in the method for hard-copying Web pages in accordance with any of the sixth to eighth aspects of the present invention, a validity period for entering a receipt identifier into the fax server is limited.

With increase in the number of fax transmission requests that involves long periods before users connect to the fax server using predetermined fax machines, it becomes troublesome to manage receipt numbers and the like. In view of this, the validity period for entering a receipt identifier into the fax server is limited to ease management tasks.

According to the method for hard-copying Web pages in accordance with a tenth aspect of the present invention, in the method for hard-copying Web pages in accordance with any of the sixth to eighth aspects of the present invention, before the notification of the receipt identifier, the user is made to enter a credit card number, a debit card number, or his/her member ID for use for user accounting.

According to the method for hard-copying Web pages in accordance with an eleventh aspect of the present invention, in the method for hard-copying Web pages in accordance with any of the sixth to eighth aspects of the present invention, when the receipt identifier is entered from the fax machine connected to the fax server via the telephone line, the user is made to enter a credit card number, a debit card number, or his/her member ID for use for user accounting together with the receipt identifier.

According to the method for hard-copying Web pages in accordance with a twelfth aspect of the present invention, in the method for hard-copying Web pages in accordance with any of the sixth to eighth aspects of the present invention, the fax output data contains only the text information and/or only the image information of the Web page.

The method for hard-copying Web pages in accordance with a thirteenth aspect of the present invention comprises:
- generating a Web page containing an item for fax transmission request;
- receiving information on the current position of a user from an Internet connection device equipped with current-position finding capabilities and notifying the user of the receipt identifier associated with the Web page, the location of a public fax machine near the user, and the telephone number of a fax server, if a request to fax the Web page is received from the user who browses the Web page on the Internet connection device equipped with current-position finding capabilities; and
- sending fax output data of the Web page corresponding to the receipt identifier to a fax machine via a telephone line if the receipt identifier is entered from the fax machine connected to the fax server via the telephone line.

The thirteenth to sixteenth aspects of the present invention can typically be used with advantage by the user to browse Web pages outdoors by means of a portable telephone with Internet capabilities and obtain hard copies of Web pages on a public fax machine at a convenience store.

The Internet connection device equipped with current-position finding capabilities can be, for example, a PHS unit or car navigation device. In a PHS network, where each base station has a limited service area, the approximate location of a user can be detected by detecting the base station connected to the user's PHS. A car navigation device allows a user's location to be detected easily, based on radio waves from GPS (Global Positioning Systems) satellites. Once the location of the user is detected, the system of the present invention searches a predetermined database for a convenience store or the like which the user can reach in a short time and where a fax machine is available and informs the user of the retrieved location of a fax machine. Then the user goes to the notified location and operates the fax machine to obtain a hard copy of the Web page via the fax machine.

According to the method for hard-copying Web pages in accordance with a fourteenth aspect of the present invention, in the method for hard-copying Web pages in accordance with the thirteenth aspect of the present invention, a validity period for entering a receipt identifier into the fax server is limited.

According to the method for hard-copying Web pages in accordance with a fifteenth aspect of the present invention, in the method for hard-copying Web pages in accordance with the thirteenth or fourteenth aspect of the present invention, the user is made to enter a credit card number, a debit card number, or his/her member ID for use for user accounting together with the fax number of a destination fax machine.

According to the method for hard-copying Web pages in accordance with a sixteenth aspect of the present invention, in the method for hard-copying Web pages in accordance with the thirteenth or fourteenth aspect of the present invention, the fax server faxes only the text information and/or only the image information of the Web page corresponding to the receipt identifier.

The method for printing display screens in accordance with a seventeenth aspect of the present invention comprises:
- generating a display screen containing an item for transmission request to a remote terminal equipped with a print function;
- making a user enter destination information about a predetermined remote terminal, if a request to send the display screen is received from the user who accesses the display screen; and
- sending information about the requested display screen to the remote terminal related to the user-entered destination information.

The remote terminal sends and receives data, information on the display screen for which the transmission request was made, via a communications line the communications line may be a wired or wireless telephone line. The remote terminal equipped with a print function may be a printer rather than a fax machine. As described above, the fax machine can be a personal computer equipped with a modem and connected with a printer.

The system for hard-copying Web pages in accordance with an eighteenth aspect of the present invention comprises:
- Web page generating means for generating a Web page containing an item for fax transmission request;
- input request means for making a user enter the fax number of a destination fax machine if a request to fax the Web page is received from the user who browses the Web page;
- storage means for storing the user-entered fax number and identifier of the requested Web page, by associating them with each other;
- faxing means for sending fax output data of the requested Web page to the fax machine of the user-entered fax number via a telephone line.

The system for hard-copying Web pages in accordance with a nineteenth aspect of the present invention comprises:
- Web page generating means for generating a Web page containing an item for fax transmission request;

notification means for notifying the user of the telephone number of a fax server together with the receipt identifier associated with the Web page if a request to fax the Web page is received from the user who browses the Web page; and faxing means for sending fax output data of the Web page corresponding to the receipt identifier to a fax machine via a telephone line if the receipt identifier is entered into the fax server from the fax machine connected to the fax server via the telephone line.

The system for hard-copying Web pages in accordance with a twentieth aspect of the present invention comprises:

Web page generating means for generating a Web page containing an item for fax transmission request;

notification means for receiving information on the current position of a user from an Internet connection device equipped with current-position finding capabilities and notifying the user of the receipt identifier associated with the Web page, the location of a public fax machine near the user, and the telephone number of a fax server, if a request to fax the Web page is received from the user who browses the Web page on the Internet connection device equipped with current-position finding capabilities; and faxing means for sending fax output data of the Web page corresponding to the receipt identifier to a fax machine via a telephone line if the receipt identifier is entered from the fax machine connected to the fax server via a telephone line.

The Internet connection device equipped with current-position detection capabilities in accordance with a twenty-first aspect of the present invention comprises:

a display which can display Web pages; and current position notification means for notifying a Web page's display server of the user's current position by detecting the current position at user request or automatically if the user clicks the item for fax transmission request contained on that Web page displayed on the display.

The Internet connection device equipped with current-position detection capabilities can be, for example, a PHS unit or car navigation device.

BRIEF DESCRIPTION OF THE DRAWINGS

FIG. 1 is a drawing showing various devices involved in faxing of Web pages and their connection to the Internet;

FIG. 2 is a block diagram showing the main components inside a fax server;

FIG. 3 is a drawing showing a screen display example of the display of a portable telephone with which a user is browsing a Web page that offers map information on the Internet;

FIG. 4 is a drawing showing a screen display example of the display of a portable telephone with which a user is browsing a Web page that offers weather forecasting on the Internet;

FIG. 5 is a drawing showing a sample link description for making a fax server run processing when a user issues a fax transmission request on a Web page which offers a service of faxing the Web page;

FIG. 6 is a drawing showing a first part of a Web page displayed on the display of a portable telephone after a user issues a fax transmission request in a push-type fax transmission service;

FIG. 7 is a drawing showing a second part of the Web page displayed on the display of the portable telephone after the user issues the fax transmission request in the push-type fax transmission service;

FIG. 8 is a drawing showing a first part of a Web page displayed on the display of a portable telephone after a user issues a fax transmission request to a pull-type fax transmission service; and FIG. 9 is a drawing showing a second part of the Web page displayed on the display of the portable telephone after the user issues the fax transmission request to the pull-type fax transmission service.

PREFERRED EMBODIMENTS OF THE INVENTION

Preferred embodiments of the present invention will be described below with reference to the attached drawings.

FIG. 1 shows various devices involved in faxing of Web pages and their connection to the internet 10. Only one Web server 11 is shown in the figure to ease illustration. In actual practice, however, there are a plurality of Web servers 11 with pages that can be faxed. The Internet 10 has Web server 11, fax server 12, and various Internet connection devices connected constantly or via dial-up connections. The Internet connection devices include PHS units 18, portable telephones 19, PDAs 20, mobile personal computers 23, desktop personal computers 24, car navigation devices 26, television sets 29 with Internet connection capabilities, audio deices 30 with Internet connection capabilities, and microwave ovens 31 with Internet connection capabilities. The fax server 12 is connected to the fax machine 36, personal computer 37 equipped with a printer 38 and a modem, or the like, via a wireless or wired public telephone line 35 as required. The Web server 11 provides Web page information in response to a request to show the page from an Internet connection device such as the portable telephone 19 and the Web page is displayed on the display of the Internet connection device that made the request.

FIG. 2 is a block diagram showing the main components inside the fax server 12. Reference numeral 44 denotes a Central Processing Unit (CPU), reference number 45 denotes a first storage that stores various programs executed by the CPU 44, and reference number 46 denotes a second storage that rewritably stores the data used for the various programs executed by the CPU 44. The CPU 44 is connected constantly to the Internet 10 via an input/output (I/O) interface 47 and connected, as required, to the public telephone line 35 via a modem 48.

FIGS. 3 and 4 show screen display examples of the display 51 of the portable telephone 19 with which a user is browsing a Web page that offers map information and a Web page that offers weather forecasting, respectively, on the Internet 10. The display 51, which has a small display area, presents only part of a map or weather forecasting for some regions. To view any part that does not fit within the display 51, the user must scroll the display 51 screen vertically or horizontally. The upper left part of the Web page being accessed is shown in FIGS. 3 and 4. This part contains a fax transmission request icon 52, an operating instruction 53, a fax transmission request character string 54, and selection item numbers 55. The fax transmission request icon 52, fax transmission request character string 54, and selection item numbers 55 are hyperlinked. Clicking them takes the user to a linked Web page. A hyperlink is either underlined as is the case with the fax transmission request character string 54 "Click here" and character string "Return" or displayed in a predetermined color. In the example of FIGS. 3 and 4, the fax transmission request icon 52, fax transmission request character string 54, and selection item number "1" 55 are linked to the same page. The user can display the screen of the same linked page by pressing any of them. The operating instruction 53 is a caption for the fax transmission request icon 52 or fax transmission request character string 54. It instructs the user to click the fax transmission request icon 52 or fax transmission request character string 54 if he/she wants the currently displayed Web page to be sent to a predetermined fax machine 36. To make a fax transmission request for the Web page currently displayed on the display 51 to obtain its hard copy, the user should position the cursor on the fax transmission request icon 52, fax transmission request character string 54, or selection item number "1" 55 and click it, or press the key or button of the number assigned to the selection item ("1" in the example of FIGS. 3 and 4). It is also possible to set up the same link on the operating instruction 53 itself as on the fax transmission request icon 52, allowing the user to click the operating instruction 53 instead of the fax transmission request icon 52 or fax transmission request character string 54. In that case, the fax transmission request character string 54 can be omitted.

FIG. 5 show a sample link description for making the fax server 12 run processing when a user issues a fax transmission request on a Web page which offers a service of faxing the Web page. Links are created by means of CGI, Java Applets, Active-X Controls, or the like. Thus, in addition to the text and images displayed on the Web page7, the source files of the Web page include the link description that defines the processing to be run when the fax transmission request icon 52, fax transmission request character string 54, or selection item number "1," 55 is clicked. The link description in FIG. 5 is written as a CGI script. <a> on the first line is a tag description a link called on anchor. A link represents a connection between one Web resource and another. </a> on the fourth line means the end of <a>. The second line <a href="faxserver.ibm.com/scripts/ Fax1.exe?url=www.jp.ibm.com"> defines the referent (a href=""). Fax1.exe is the name of the CGI program to be executed when this line is executed. This line also indicates that the CGI program is located in the "/scripts" directory of the fax server 12 whose URL is faxserver.ibm.com and that the Web page to be printed is located at http://www.jp.ib-m.com. Thus, the URL of the Web page shown in FIGS. 3 and 4 is assumed to be http://www.jp.ibm.com. The third line <img width=468 height=60 src="Fax1.gif"alt="Click Here!" Border=0> defines the image width (img width=468), image height (height=601, image file (src="Fax1.gif"), characters to be displayed alternatively when the image cannot be displayed (alt="Click Here!"), and border line (Border=0). Then, when the user positions the cursor on the fax transmission request icon 52, fax transmission request character string 54, or selection item number "1" 55 on the display 51 and clicks it, or presses the key or button of the number assigned to the selection item ("1" in the example of FIGS. 3 and 4); the link shown in FIG. 5 is executed, the URL of the requested Web page is passed to the fax server 12 as an argument, and the "Fax-1.exe" program in the "faxserver.ibm.com/scripts" directory of the fax server 12 is executed.

FIGS. 6 and 7 show a Web page displayed on the display 51 of the portable telephone 19 after a user issues a fax transmission request in a push-type fax transmission service. The screen in FIG. 7 is the screen in FIG. 6 as the latter is scrolled down. For example, if the fax transmission request icon 52, fax transmission request character string 54, or selection item number "1" 55 in FIGS. 3 and 4 is clicked, the screen on the display 51 of the portable telephone 19 switches to the one shown in FIG. 6. Since the display area of the display 51 of the portable telephone 19 is limited, the user must scroll the screen to view the entire page. The user enters, in the landscape text boxes, his/her member ID as well as the fax number of the fax machine 36, which is the fax destination of the Web page. Also, a message is displayed, as accounting information, stating that the user who issues a fax transmission request will be charged 50 cents per page. In this example, the member ID has been associated with a credit card number or bank account number. The user has only to enter the member ID, and the transmission charge is debited automatically from the bank account or the like associated with the member ID. Also, the user may enter a credit card number instead of his/her member ID. Besides, the user is normally obliged to enter the password related to the member ID or to the credit card. When the user finishes entering the member ID and fax number, he/she clicks the OK button if he/she agrees to the accounting. The fax server 12 immediately dials the fax number specified by the user. When a connection is established, the fax server 12 accesses the URL for which the fax transmission request was made by the user, generates fax output data based on the Web page, and sends the fax output data. Consequently, a hard copy of the Web page requested by the user is printed out from the fax machine 36 specified by the user.

FIGS. 8 and 9 show a Web page displayed on the display 51 of the portable telephone 19 after a user issues a fax transmission request in a pull-type fax transmission service. The screen in FIG. 9 is the screen in FIG. 8 as the latter is scrolled down. For example, if the fax transmission request icon 52, fax transmission request character string 54, or selection item number "1" 55 in FIGS. 3 and 4 is clicked, the screen on the display 51 of the portable telephone 19 switches to the one shown in FIG. 8. Since the display area of the display 51 of the portable telephone 19 is limited, the user must scroll the screen to view the entire page. The user is informed of the telephone number xxx-xxxx-xxxx to call from the fax machine 36 to obtain a hard copy of the Web page as well as of a receipt identifier. The user is also notified that the validity period of the receipt identifier is, for example, seven days. The user memorizes or writes down the telephone number and receipt identifier, goes to the fax machine 36 at home, office, or school where a hard copy is to be obtained, calls the telephone number, and when a connection is established, enters the receipt identifier using the push buttons of the fax machine 36. Then, the fax server 12 accesses the URL corresponding to the receipt identifier, generates fax output data from the images on the Web page corresponding to the URL, and sends the fax output data to the fax machine 36. This makes the fax machine 36 print out the Web page requested by the user, in hard-copy form on paper. The fax output data generated based on a Web page may be prepared before the user calls up. Besides, the user may call the telephone number of the fax server 12 using a personal computer 37 equipped with a modem instead of using the fax machine 36, receive the hard-copy data of the Web page to the personal computer 37 equipped with a modem, generate images based on the hard-copy data, and print them out on fax paper from a printer 38.

The invention claimed is:
1. A method for hard-copying Web pages comprising the steps of:
  generating a Web page containing an item for a fax transmission request;

notifying a user of the telephone number of a fax server together with a receipt identifier associated with the Web page if a request to fax the Web page is received from said user who browses said Web page; and sending fax output data of the Web page corresponding to the receipt identifier to a fax machine via a telephone line if the receipt identifier is entered into said fax server from said fax machine connected to said fax server via the telephone line.

2. The method for hard-copying Web pages according to claim 1, further comprising the steps of:

receiving by said fax server said fax transmission request from the user who browses said Web page;

obtaining by said fax server, upon receiving the fax transmission request, the URL of the requested Web page and storing the URL associating it with said receipt identifier;

accessing by said fax server the Web page of the URL which corresponds to the receipt identifier and generating a fax output identifier which is entered into said fax server from a fax machine connected to said fax server via a telephone line; and sending by said fax server fax output data to said fax machine via the telephone line.

3. The method for hard-copying Web pages according to claim 1, further comprising the steps of:

receiving by said fax server said fax transmission request from the user who browses said Web page;

accessing by said fax server to obtain, upon receiving the fax transmission request, the URL of the requested Web page;

accessing by said fax server the Web page of the URL;

generating by said fax server fax output data based on the Web page, and storing the URL associating it with said receipt identifier; and sending by said fax server the fax output data stored and associated with the receipt identifier to a fax machine via a telephone line if the receipt identifier is entered into said fax server from said fax machine connected to said fax server via the telephone line.

4. The method for hard-copying Web pages according to claim 1, wherein a validity period for entering a receipt identifier into the fax server is limited.

5. The method for hard-copying Web pages according to claim 1, wherein before the notification of said receipt identifier, the user is prompted to enter a credit card number, a debit card number, or his/her member ID for use for user accounting.

6. The method for hard-copying Web pages according to claim 1, wherein when the receipt identifier is entered from the fax machine connected to said fax server via the telephone line, the user is prompted to enter a credit card number, a debit card number, or his/her member ID for use for user accounting together with said receipt identifier.

7. The method for hard-copying Web pages according to claim 1, wherein said fax output data contains only text information of the Web page.

8. A method for hard-copying Web pages comprising the steps of:

generating a Web page containing an item for fax transmission request;

receiving information on a current position of a user from an Internet connection device equipped with current-position finding capabilities and notifying the user of the receipt identifier associated with the Web page, the location of a public fax machine near the user, and the telephone number of a fax machine, if a request to fax the Web page is received from said user who browses said Web page on the Internet connection device equipped with current-position finding capabilities; and sending fax output data of the Web page corresponding to the receipt identifier to a fax machine via a telephone line if the receipt identifier is entered from said fax machine connected to the fax server via the telephone line.

9. The method for hard-copying Web pages according to claim 8, wherein a validity period for entering a receipt identifier into the fax server is limited.

10. The method for hard-copying Web pages according to claim 8, wherein the user is prompted to enter a credit card number, a debit card number, or his/her ID for use for user accounting together with the fax number of a destination fax machine.

11. The method for hard-copying Web pages according to claim 8, wherein said fax output data contains only the text information of the Web page.

12. A computer readable medium storing a program for a system for hard-copying Web pages, comprising:

Web page generating logic for generating a Web page containing an item for fax transmission request;

notification logic for notifying a user of the telephone number of a fax server together with the receipt identifier associated with the Web page if a request to fax the Web page is received from said user who browses said Web page; and faxing logic for sending fax output data of the Web page corresponding to the receipt identifier to a fax machine via a telephone line if the receipt identifier is entered into said fax server from said fax machine connected to said fax server via the telephone line.

13. A computer readable medium storing a program for a system for hard-copying Web pages, comprising:

Web page generating logic for generating a Web page containing an item for fax transmission request;

notification logic for receiving information on the current position of a user from an Internet connection device equipped with current-position finding capabilities and notifying the user of the receipt identifier associated with the Web page, the location of a public fax machine near the user, and the telephone number of a fax server, if a request to fax the Web page is received from said user who browses said Web page on the Internet connection device equipped with current-position finding capabilities; and faxing logic for sending fax output data for the Web page corresponding to the receipt identifier to a fax machine via telephone line if the receipt identifier is entered from the fax machine connected to said fax server via a telephone line.

* * * * *